United States Patent
Doster et al.

(10) Patent No.: US 10,187,171 B2
(45) Date of Patent: Jan. 22, 2019

(54) METHOD FOR FREE SPACE OPTICAL COMMUNICATION UTILIZING PATTERNED LIGHT AND CONVOLUTIONAL NEURAL NETWORKS

(71) Applicant: THE UNITED STATES OF AMERICA, AS REPRESENTED BY THE SECRETARY OF THE NAVY, Washington, DC (US)

(72) Inventors: Timothy Doster, Washington, DC (US); Abbie T. Watnik, Washington, DC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/914,015

(22) Filed: Mar. 7, 2018

(65) Prior Publication Data

US 2018/0262291 A1     Sep. 13, 2018

Related U.S. Application Data

(60) Provisional application No. 62/467,941, filed on Mar. 7, 2017.

(51) Int. Cl.
*H04B 10/00* (2013.01)
*H04J 14/00* (2006.01)
(Continued)

(52) U.S. Cl.
CPC ............... *H04J 14/00* (2013.01); *G06N 3/08* (2013.01); *H04B 10/112* (2013.01); *H04B 10/50* (2013.01); *H04B 10/60* (2013.01); *H04B 10/80* (2013.01)

(58) Field of Classification Search
USPC .................................. 398/118–131, 202–214
See application file for complete search history.

(56) References Cited

U.S. PATENT DOCUMENTS

| | | | | |
|---|---|---|---|---|
| 5,963,710 A | * | 10/1999 | Masumoto | G05B 13/027 398/106 |
| 7,224,370 B1 | * | 5/2007 | Ye | H04B 10/1141 345/581 |

(Continued)

OTHER PUBLICATIONS

Soskin et al., Topological Charge and Angular Momentum of Light Beams Carrying Optical Vortices, Physical Review A, Nov. 1997, pp. 4064-4075, vol. 56, No. 5, The American Physical Society, College Park, MD, USA.

(Continued)

*Primary Examiner* — Agustin Bello
(74) *Attorney, Agent, or Firm* — US Naval Research Laboratory; Suresh Koshy

(57) ABSTRACT

An apparatus includes an optical communications receiver receiving a turbulence-distorted, optical signal. The turbulence-distorted, optical signal includes a plurality of fundamental modes encoded via a combinatorial multiplexings dictionary. The received optical signal includes a plurality of two-dimensional images. Each two-dimensional image of the plurality of two-dimensional images respectively represents received fundamental modes of the plurality of fundamental modes. The receiver includes a neural network trained to assign to each two-dimensional image of the plurality of two-dimensional images at least one respective active fundamental mode of the plurality of fundamental modes and a corresponding accuracy probability based on the dictionary.

19 Claims, 3 Drawing Sheets

(51) Int. Cl.
  *H04B 10/60* (2013.01)
  *H04B 10/112* (2013.01)
  *G06N 3/08* (2006.01)
  *H04B 10/50* (2013.01)
  *H04B 10/80* (2013.01)

(56) References Cited

U.S. PATENT DOCUMENTS

| | | | | |
|---|---|---|---|---|
| 7,711,441 B2* | 5/2010 | Tillotson | B60L 8/00 | 136/246 |
| 7,782,336 B2* | 8/2010 | Ye | H04B 10/1141 | 345/581 |
| 8,055,014 B2* | 11/2011 | Ellingson | H04N 1/32101 | 382/100 |
| 8,123,134 B2* | 2/2012 | Reed | B41M 3/144 | 235/462.01 |
| 8,150,032 B2* | 4/2012 | Rhoads | G06K 7/1417 | 380/51 |
| 8,184,849 B2* | 5/2012 | Rhoads | G06K 9/00442 | 382/100 |
| 8,184,851 B2* | 5/2012 | Rhoads | G06F 17/30876 | 382/100 |
| 8,184,972 B2* | 5/2012 | Parker | G02F 1/0136 | 380/255 |
| 8,364,966 B2* | 1/2013 | Johnson | G06T 1/0021 | 713/176 |
| 8,379,908 B2* | 2/2013 | Davis | G06K 19/086 | 382/100 |
| 8,411,955 B2* | 4/2013 | Kimura | G06K 9/481 | 382/182 |
| 8,432,884 B1* | 4/2013 | Ashrafi | H04L 5/04 | 370/343 |
| 8,873,618 B2* | 10/2014 | Snow | H04N 21/4126 | 375/240 |
| 9,053,431 B1* | 6/2015 | Commons | G06N 3/0454 | |
| 9,077,577 B1* | 7/2015 | Ashrafi | H04L 27/362 | |
| 9,875,440 B1* | 1/2018 | Commons | G01C 21/3602 | |
| 9,998,187 B2* | 6/2018 | Ashrafi | H04B 7/0456 | |
| 10,084,541 B2* | 9/2018 | Ashrafi | H04B 10/2504 | |
| 2003/0160194 A1* | 8/2003 | Potyrailo | G01H 5/00 | 250/559.27 |
| 2004/0005093 A1* | 1/2004 | Rhoads | G06K 7/1417 | 382/232 |
| 2005/0259914 A1* | 11/2005 | Padgett | H01Q 21/26 | 385/16 |
| 2006/0054793 A1* | 3/2006 | Curtis | B01F 13/0052 | 250/221 |
| 2010/0013696 A1* | 1/2010 | Schmitt | G01S 7/024 | 342/54 |
| 2010/0282984 A1* | 11/2010 | Kreysing | B03C 5/005 | 250/492.1 |
| 2011/0114831 A1* | 5/2011 | Grier | G02B 21/32 | 250/251 |
| 2012/0223219 A1* | 9/2012 | Grier | G02B 5/32 | 250/251 |
| 2013/0027774 A1* | 1/2013 | Bovino | G02B 26/06 | 359/485.01 |
| 2013/0182620 A1* | 7/2013 | Chaffee | H04B 10/11 | 370/310 |
| 2013/0235744 A1* | 9/2013 | Chen | H04L 47/82 | 370/252 |
| 2014/0193162 A1* | 7/2014 | Iizuka | H04B 10/1129 | 398/172 |
| 2014/0355624 A1* | 12/2014 | Li | H04L 27/00 | 370/468 |
| 2015/0248793 A1* | 9/2015 | Abovitz | G06K 9/00671 | 345/633 |
| 2016/0127073 A1* | 5/2016 | Ashrafi | H04B 10/516 | 398/44 |
| 2016/0204896 A1* | 7/2016 | Yu | H04J 14/086 | 398/65 |
| 2017/0026095 A1* | 1/2017 | Ashrafi | H04B 7/0456 | |
| 2017/0230115 A1* | 8/2017 | Ashrafi | H04B 10/2504 | |
| 2018/0069631 A1* | 3/2018 | Ashrafi | H04B 10/2507 | |
| 2018/0077769 A1* | 3/2018 | Maxik | H05B 33/0818 | |
| 2018/0262243 A1* | 9/2018 | Ashrafi | H04B 7/0456 | |
| 2018/0262291 A1* | 9/2018 | Doster | H04J 14/00 | |
| 2018/0331763 A1* | 11/2018 | Ashrafi | H04B 10/40 | |

OTHER PUBLICATIONS

Lavery et al., Measurement of the Light Oribital Angular Momentum Spectrum Using an Optical Geometric Transformation, Journal of Optics, Apr. 27, 2011, pp. 1-4, vol. 13, No. 064006, IOP Publishing, Bristol, UK.

Lavery et al., Detection of a Spinning Object Using Light's Orbital Angular Momentum, Science, Aug. 2, 2013; pp. 537-540, vol. 341, American Association for the Advancement of Science, Washington, DC, USA.

Leach et al., Measuring the Orbital Angular Momentum of a Single Photon, Physical Review Letters, Jun. 5, 2002, pp. 257901-1-257901-4, vol. 88, No. 25, The American Physical Society, College Park, MD, USA.

Krenn et al., Communication with Spatially Modulated Light Through Turbulent Air Across Vienna, New Journal of Physics, Nov. 11, 2014, pp. 1-10, vol. 16, No. 113028, IOP Publishing and Deutsche Physikalische Gesellschhaft, Bristol, UK.

Forbes et al., Creation and Detection of Optical Modes with Spatial Light Modulators, Advances in Optics and Photonics, Apr. 26, 2016, pp. 200227, vol. 8, No. 2, The Optical Society, Washington, DC, USA.

Gibson et al., Free-space Information Transfer Using Light Beams Carrying Orbital Angular Momentum, Optics Express, Nov. 1, 2004, pp. 5448-5456, vol. 12, No. 22, The Optical Society, Washington, DC USA.

* cited by examiner

METHOD FOR FREE SPACE OPTICAL COMMUNICATION UTILIZING PATTERNED LIGHT AND CONVOLUTIONAL NEURAL NETWORKS

CROSS-REFERENCE TO RELATED APPLICATIONS

This application claims priority to U.S. Provisional Patent Application Ser. No. 62/467,941, entitled "A METHOD OF FREE SPACE OPTICAL COMMUNICATION UTILIZING PATTERNED LIGHT AND CONVOLUTIONAL NEURAL NETWORKS," to Doster et al., which was filed on 7 Mar. 2017 and is incorporated herein by reference.

BACKGROUND OF THE INVENTION

Field of the Invention

This invention relates in general to a method and/or apparatus for optical communications, and in particular to a method and/or apparatus for facilitating improved communication fidelity in optical communications by providing a more robust demultiplexing technique for patterned light.

Description of the Related Art

Free-space optical ("FSO") communication is the transmission of information over a distance between a transmitter and a receiver using optical wavelengths, e.g., ultraviolet, visible, and infrared. FSO communication contrasts with fiber-based communication systems as it does not require a physical communication link and relies on the atmosphere (or water) as the transmission medium as opposed to an optical fiber. This is valuable when it is necessary to communicate line-of-sight between non-fixed locations or when established (e.g., fiber-based) communication systems are insufficient, too costly to establish or have been destroyed, for example, by natural disasters or hostile actors. FSO also offers the advantage of slightly faster transmission due to the speed of light through air vs. glass. Though frequency division multiplexed radio frequency ("RF") communication also uses the atmosphere as its transmission medium, FSO offers several important advantages, namely, higher modulation bandwidth allowing higher information capacity, smaller beam divergence which provides larger signal intensity at the receiver, and improved security to prevent eavesdropping due to directionality and non-penetration of physical obstacles.

Due to the complexity of the information that needs to be transmitted and/or the length of time allowed for transmission, it is often necessary to increase the information capacity of the data link. Typically, for FSO communication, one can control the wavelength, polarization, and frequency of distinct light beams and thus multiplex together different signals. Another option is to utilize orbital angular momentum ("OAM"), a type of pattered or structured light, thus allowing beams with different mode numbers to be multiplexed together and transmitted over the same link. Each of these multiplexing techniques allows more information to be transmitted in the same amount of time and their multiplier effect can be taken in parallel.

OAM is a property of a coherent light beam that arises from the azimuthal components of linear momentum acting at the radius of the beam with a dependency of $\exp(im\theta)$. The parameter, $m \in \mathbb{Z}$, is the topological charge or mode number and indicates that there is a theoretically infinite number of modes possible; due to noise, however, this number of modes is limited, in practice. This creates a twisting of the light beam with a helical phase front and creates patterned or structured light. For the purpose of this specification, patterned or structured light is understood to mean the use of light to project a predefined pattern. OAM is one type of patterned or structured light, other examples include polarized vector beams, vector vortex beams, spiraling beams, and spin angular momentum ("SAM") beams. Without the presence of turbulence, OAM beams exhibit orthogonality, which is very useful for optical FSO communication because multiplexed beams will not interfere with each other, thus allowing recovery of each mode is possible. However, the presence of turbulence causes the mixing of information between adjacent modes, which produces channel crosstalk. Such channel crosstalk results in the degradation of the signal and a loss of information.

The orthogonality property of OAM beams allows different mode numbers to be multiplexed together or optically combined into a single beam. After propagating through the atmosphere and arriving at a receiver, the multiplexed OAM beam must be demultiplexed to ascertain which modes are present in the signal. There are several standard demultiplexing or sorting techniques for OAM, which have been designed to take advantage of the unique properties of these beams. These methods, however, require detailed optical alignment of the system to correctly detect the demultiplexed energy and assign it the correct input mode.

Conjugate-mode sorting is a standard method to determine the OAM mode of a detected beam based on its orthogonality properties. Given a transmitted OAM beam, $u_m$, with mode m, the support of the mode set, $u_n^*$ is cycled through, where $u_n^*$ is the conjugate of $u_m$, forming the product $u_m u_n^*$. If the intensity is detected only at the origin, i.e., no doughnut mode, then the transmitted signal contains OAM mode n. This sorting method is dependent on having good alignment between the transmitter and the receiver; misalignment is shown to have comparable effects to turbulence in the correct determination of the OAM mode. Turbulence causes the normalized energy to not be concentrated exactly at the origin of the correct conjugate mode, thereby requiring a search of the relative energy across all the modes.

In optical transformation mode sorting, a single transformation is used to detect the presence of multiple OAM modes at once, referred herein as log-polar mode sorting. In a log-polar mode sorting method, the OAM beam arriving at the aperture is first transformed from Cartesian coordinates to log polar coordinates according to, $$(x,y) \mapsto (\rho,\theta) = (\log(\sqrt{x^2+y^2}) \cdot \arctan(y/x)).$$

This transformation can be seen geometrically as mapping a ring to rectangle. Such mapping is translating rotation and scaling to vertical and horizontal shifts. After the mapping, a Fourier transform is applied to the new coordinate space. By measuring the intensity of the integer shifts in the Fourier plane one can detect the relative intensity in various modes. Such a system is designed, using two SLMs with patterns, $\phi_1(x, y)$ and $\phi_2(u, v)$:

$$\phi_1(x, y) = 2\frac{\pi a}{\lambda f}\left[y \arctan\frac{y}{x} - x \log\frac{\sqrt{x^2+y^2}}{b} + x\right],$$

-continued $$\phi_2(u, v) = -\frac{2\pi ab}{\lambda f}\exp\frac{-u}{a}\cos\frac{v}{a},$$

where a and b are scaling and translation parameters and $\phi_1$ transform the beam and $\phi_2$ corrects the phase distortion. The demultiplexing system is very sensitive to the placement of transforming elements, where a small displacement errors can cause phase errors. Improvements can be made to the log-polar sorting method by utilizing beam copy through standard fanout holograms.

Counting spiral fringes is a standard technique where inside an interferometer a plane reference wave is interfered with the source beam carrying OAM and a phase structure of exp(im$\theta$). The produced fringes correspond to the discontinuities produced when the phase moves from $2\pi$ to 0 in the phase wrap; counting these fringes will give the mode number m. More complex multiplexings of OAM modes require a mapping of the source phase structure. This is accomplished by changing the plane wave phase and increasing the number of phase steps measured in the range of 0 to $2\pi$. A standard Dove prism interferometer adds two Dove prisms to the interferometer setup. These prisms are phase aligned to have a difference of $\pi/2$. Constructive interference forms in one of the two output ports depending on the parity of the input beam. By adjusting the phase difference between the two prisms, further information about the even parity input mode is determined. Adding a standard +1 mode step hologram to the odd port allows similar information gain for the odd case. Such method embodiments of the invention, which use an interferometer, detect single OAM modes easily, but demultiplexing multiple modes requires parallel processing with beam splitters or more elaborate setups.

Measuring the Doppler effect, the change in the frequency of a wave as the distance between observer and source change, can also be used to determine the OAM mode of a beam. In this setup a Dove prism is rotated at a fixed angular frequency of $\omega$. An OAM beam passing through the rotating prism with mode number m will produce a frequency shift of $\omega$m.

A standard self-organizing map ("SOM"), which is a standard machine learning technique, is used to sort OAM superpositions (±m). This method does move away from the practice of measuring OAM using optically-based techniques (i.e., holograms, interferometers, etc.) but does not take advantage of the spatial and symmetric information present in the OAM patterned light. It also does not multiplex the OAM modes but instead uses a single superposition for each unique piece of data that needs to be transmitted; i.e., to communicate the numbers 0, 1, . . . , 15 would require 16 unique superpositions instead of the 4 required with a binary encoding.

BRIEF SUMMARY OF THE INVENTION

An embodiment of the invention includes an apparatus. The apparatus includes an optical communications receiver receiving a turbulence-distorted, optical signal. The turbulence-distorted, optical signal includes a plurality of fundamental modes encoded via a combinatorial multiplexings dictionary. The received optical signal includes a plurality of two-dimensional images. Each two-dimensional image of the plurality of two-dimensional images respectively represents received fundamental modes of the plurality of fundamental modes. The receiver includes a neural network trained to assign to each two-dimensional image of the plurality of two-dimensional images at least one respective active fundamental mode of the plurality of fundamental modes and a corresponding accuracy probability based on the dictionary.

An embodiment of the invention includes a method. A plurality of fundamental modes is selected. The selected plurality of fundamental modes includes a number of the plurality of fundamental modes and a type of the plurality of fundamental modes. A first training set of turbulence-distorted fundamental modes is generated based on the selected plurality of fundamental modes. A neural network is trained using the first training set. An optical communications receiver comprising the trained neural network is provided.

An embodiment of the invention includes a convolutional neural network-based demultiplexing method. This method utilizes a convolutional neural network ("CNN") trained on various multiplexing patterns from a fixed mode set at varying levels of turbulence. A CNN will be trained on all possible OAM mode patterns for a transmit dictionary, i.e., all possible bit-string encodings. For example, transmitting messages of bit-length M require M different OAM modes and the training of the neural network to distinguish $2^M$ different multiplexed mode patterns. In the testing phase of this embodiment of the invention, this network would be used to demultiplex a received OAM signal by predicting which of the $2^M$ possible multiplexing had the highest probability of matching the incoming signal.

An embodiment of the invention includes a CNN-based demultiplexing method that avoids costly optical solutions by relying only on an intensity image of the unique multiplexing patterns at the receiver side. The natural translation invariance built into such a network topology eliminates the difficult and time consuming alignment process between the optical elements which would be required for traditional demultiplexing techniques.

Trained networks according to an embodiment of the invention are robust to sensor noise, low photon counts, limited training data, and unseen turbulence levels. For example, the CNN-based demultiplexing method according to an embodiment of the invention does not alter the OAM beam. As another example, the CNN-based demultiplexing method incorporates the notion of adjusting for turbulence by training over a series of different turbulence levels. This allows for a system which is robust to a wide range of turbulence levels and does not require an active adaptive optics solution to mitigate turbulence; though, such a system could be used in conjunction with this method.

DETAILED DESCRIPTION OF THE INVENTION

Figure 2:
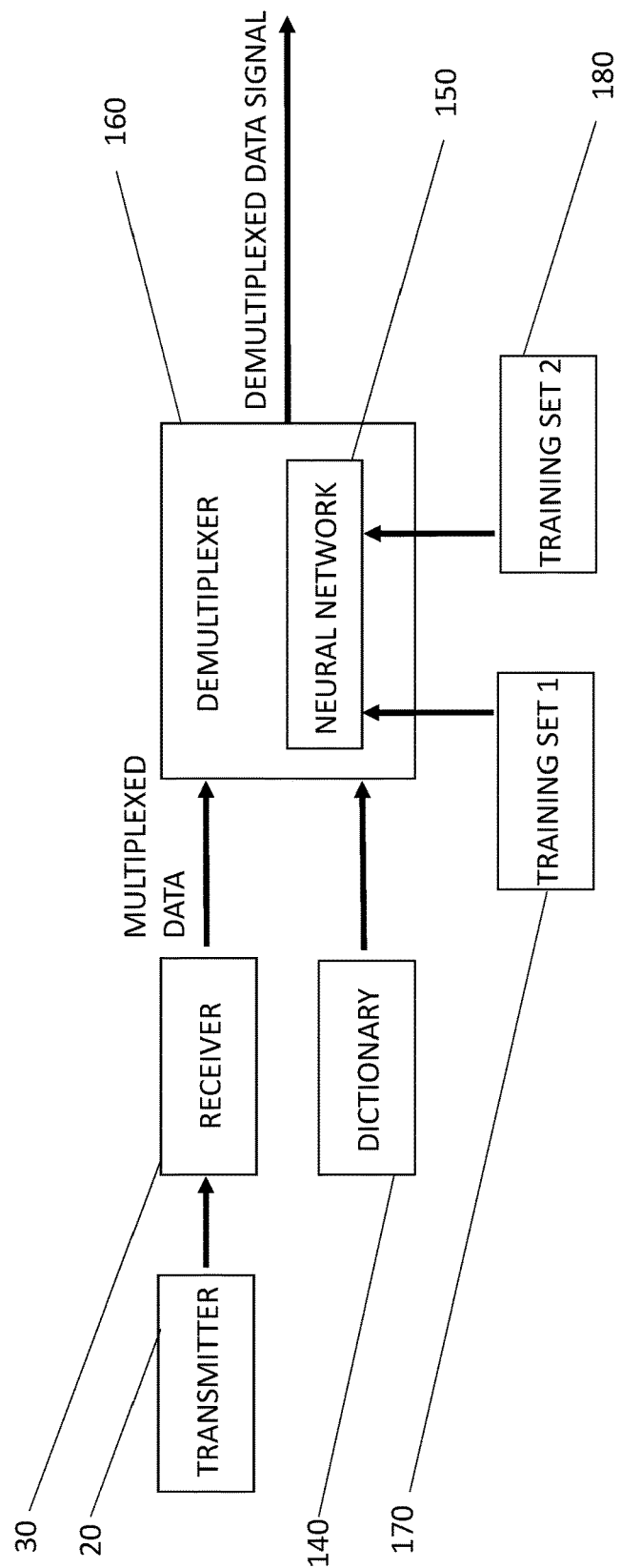
FIG. 2 is another block diagram representing an apparatus for practicing a neural network-based mode demultiplexing method according to an embodiment of the invention, wherein the neural network communicates with and is external to the optical communications receiver.
Figure 3:
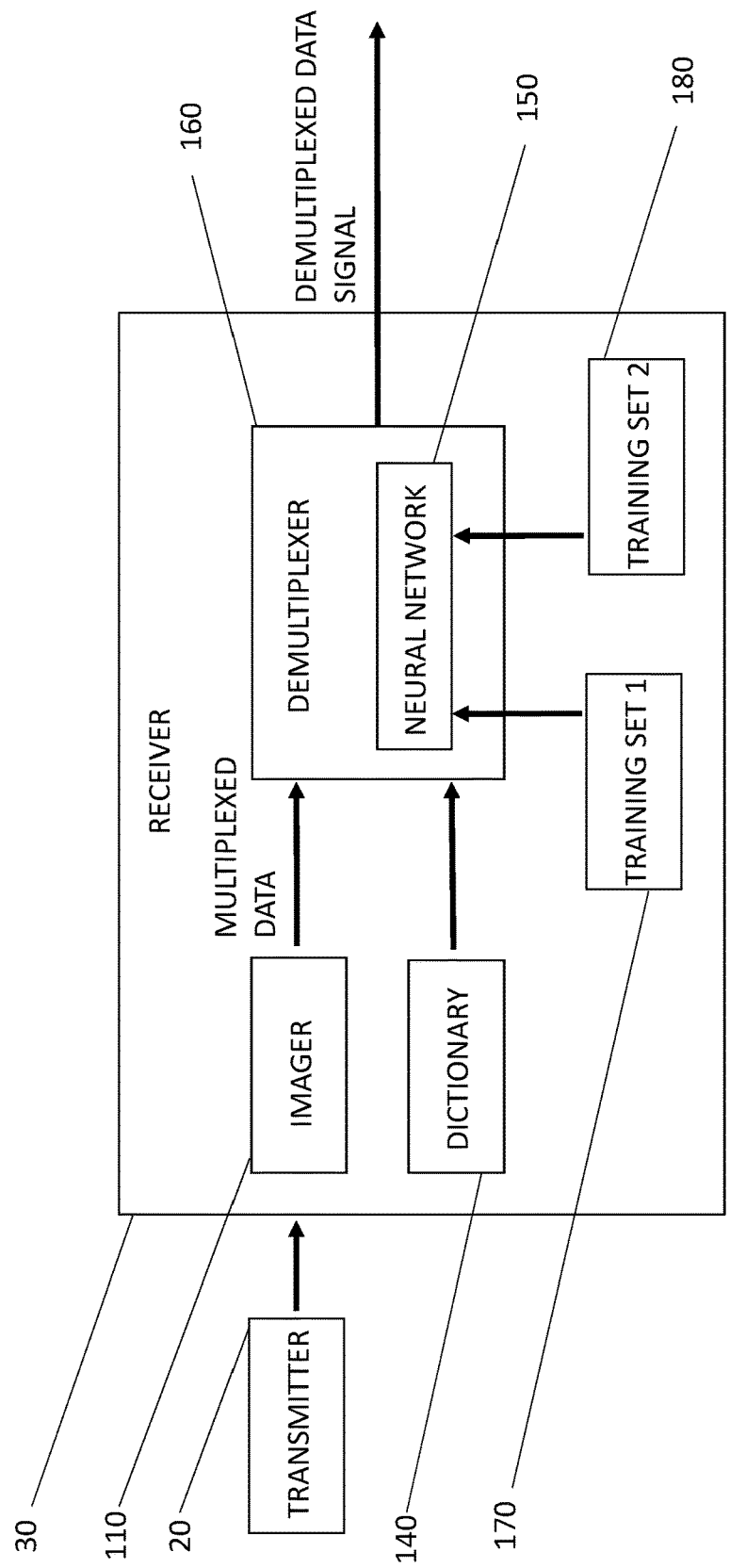
FIG. 3 is another block diagram representing an apparatus for practicing a neural network-based mode demultiplexing method according to an embodiment of the invention, wherein the neural network is internal to the optical communications receiver.

An embodiment of the invention includes an optical communication system 10, which is described as follows with reference by way of illustration to FIGS. 1-3. As shown by way of example, in FIG. 1, the optical communication system 10 generally includes a standard optical communications transmitter 20 communicating with a standard optical communications receiver 30 over a turbulence-inducing environment. Examples of such environments include a free-space environment and a water environment. One of ordinary skill in the art will readily appreciate that the optical communications transmitter 20 includes a standard free-space optical communications transmitter or a standard underwater optical communications transmitter, depending on the environment through which optical signals are to be transmitted. Likewise, one of ordinary skill in the art will readily appreciate that the optical communications receiver 30 includes a standard free-space optical communications receiver or a standard underwater optical communications receiver, depending on the environment through which optical signals are to be transmitted.

The optical communications transmitter 20 includes a laser 40, a standard mode multiplexer 50 communicating with the laser, and a standard processor 60 communicating with the mode multiplexer to generate an original, optical signal. Optionally, the mode multiplexer 50 includes a standard spatial and temporal phase modulator and/or a standard spatial and temporal amplitude modulator. The spatial and temporal phase modulator includes, for example, a standard spatial light modulator, a standard diffractive waveplate, or a standard phase plate. The spatial and temporal amplitude modulator includes, for example, a standard spatial light modulator or a standard coded mask. The optical communications transmitter 20 includes the laser 40 communicating with mode multiplexer 50. For example, the laser 40 communicates with the mode multiplexer 50 via standard first optics element 70 and/or standard first mirror element 80. The first optics element 70, for example, includes a standard concave lens and/or a standard convex lens. The output of the mode multiplexer 50, i.e., the original optical signal, for example, passes out of the optical communications transmitter 20 into the environment. For example, the original optical signal passes out of the optical communications transmitter 20 into the environment via a standard second optics element 90 and/or a standard second mirror 100. The second optics element 90 includes at least one standard convex lens and/or a standard pinhole. For example, the pinhole selects the correct order of the beam and/or removes at least some noise, or interference, caused by the creation of the multiplexed signal. The environment distorts the original, optical signal into a turbulence-distorted, optical signal.

Figure 1:
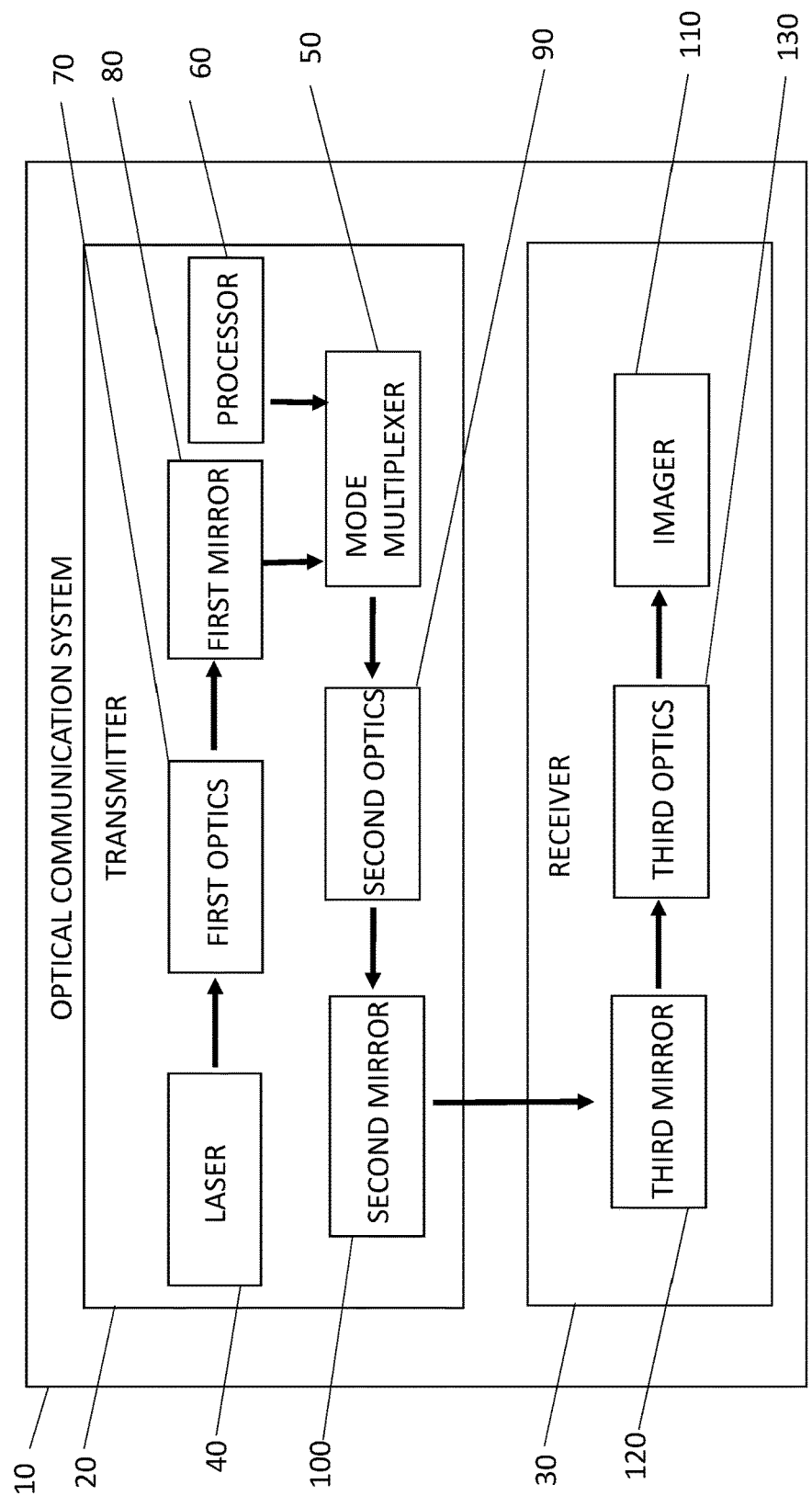
FIG. 1 is a block diagram representing an apparatus for practicing a neural network-based mode demultiplexing method according to an embodiment of the invention.

As shown by way of example in FIG. 1, the optical communications receiver 30 receives the turbulence-distorted, optical signal. The optical communications receiver 30, for example, includes a standard imager 110. The imager 110, for example, includes a standard camera. For example, the turbulence-distorted, optical signal passes through a standard third mirror 120 and/or a standard third optics element 130 to the imager 110. For example, the third optics element 130 includes a standard convex lens to focus the turbulence-distorted, optical signal onto the imager 110. The received turbulence-distorted, optical signal includes a plurality of fundamental modes encoded via a combinatorial multiplexings dictionary 140. The received optical signal includes a plurality of two-dimensional images. Each two-dimensional image of the plurality of two-dimensional images respectively represents received fundamental modes of the plurality of fundamental modes. The optical communications receiver 30 includes a standard neural network 150 trained to assign to each two-dimensional image of the plurality of two-dimensional images at least one respective active fundamental mode of the plurality of fundamental modes and a corresponding accuracy probability based on the dictionary 140. As shown in the embodiment of the invention illustrated in FIG. 2, the neural network 150 as being external to and communicating with the optical communications receiver 30. One of ordinary skill in the art will readily appreciate that neural network 150 is alternatively located in the optical receiver 30, as shown in the embodiment of the invention illustrated in FIG. 3.

Optionally, the receiver 30 includes a demultiplexer 160. The demultiplexer 160 includes the neural network 150. Optionally, the optical communications receiver 30 includes the imager 110 communicating with the demultiplexer 160.

Optionally, the neural network 150 includes a standard Recurrent Neural Network, a standard Convolutional Neural Network, a standard Feed Forward Neural Network, a standard Long Term Short Term Memory Neural Network, a standard Residual Neural Network, a standard Multilayer Perceptron, a standard Hopfield Neural Network, a standard Stacked Autoencoder, and/or a standard Deep Belief Network.

Optionally, the neural network includes a plurality of weights. The optical communications system 10 further includes one or more training sets 170, 180 of turbulence-distorted, multiplexed fundamental modes. The plurality of weights is trained on a first training set 170.

Another embodiment of the invention includes a method of neural network-based demultiplexing and is described as follows with reference by way of illustration to FIGS. 2 and 3. A plurality of standard fundamental modes is selected. The selected plurality of fundamental modes includes a number of the plurality of fundamental modes and a type of the plurality of fundamental modes. A first training set 170 of turbulence-distorted fundamental modes is generated based on the selected plurality of fundamental modes. A neural network 150 is trained using the first training set 170. An optical communications receiver 30 is provided comprising the trained neural network 150.

Optionally, the free-space optical communications receiver 30 includes the trained neural network 150. A turbulence-distorted, optical signal encoded using a combinatorial multiplexings dictionary 140 is received at the optical communications receiver 30. The received optical signal includes a plurality of two-dimensional images representing the plurality of fundamental modes. At least one respective active fundamental mode of the plurality of fundamental modes and a corresponding accuracy probability based on the dictionary is assigned to the each two-dimensional image of the plurality of two-dimensional images using a standard neural network 150. Optionally, the optical communications receiver 30 includes a standard demultiplexer 160, which in turn includes the neural network 150. The plurality of two-dimensional images represents multiplexed fundamental modes of the plurality of fundamental modes. Optionally, the multiplexed fundamental modes of the plurality of fundamental modes include wavelength-multiplexed fundamental modes of the plurality of fundamental modes and/or spatial multiplexed fundamental modes of the plurality of fundamental modes. Optionally, the free-space optical communications receiver 30 includes a standard imager 110 communicating with the demultiplexer 160. The receiving at the free-space optical communications receiver a turbulence-distorted, optical signal includes the following steps. The turbulence-distorted, optical signal is received using the imager 110. The plurality of two-dimensional images is generated using the imager 110. The each two-dimensional image of the plurality of two-dimensional images is transmitted from the imager 110 to the demultiplexer 160.

Optionally, the dictionary 140 includes a plurality of the combinatorial multiplexings of the selected plurality of fundamental modes. The first training set 170 of turbulence-distorted, fundamental modes includes a plurality of turbulence-distorted realizations for each combinatorial multiplexings of the plurality of combinatorial multiplexings. The combinatorial multiplexings dictionary is generated based on the plurality of combinatorial multiplexings of the selected plurality of fundamental modes.

Optionally, the assigning to the each two-dimensional image of the plurality of two-dimensional images at least one respective active fundamental mode of the plurality of fundamental modes and a corresponding accuracy probability includes 1) outputting, using the neural network 150, a single label corresponding to the plurality of combinatorial multiplexings and a probability distribution over the plurality of combinatorial multiplexings, or 2) outputting, using the neural network, a plurality of labels respectively corresponding to the fundamental modes, and a plurality of probability distributions of the selected plurality of fundamental modes.

Optionally, the neural network 150 includes a plurality of weights. The plurality of weights is set by the neural network 150 trained on the first training set 170. A second training set 180 of turbulence-distorted fundamental modes is generated based on the selected plurality of fundamental modes. The second training set 180 is at least partly different from the first training set 170. The neural network 150 is trained using the second training set 180, thereby fine-tuning the plurality of weights. Optionally, the original, optical signal includes error-correcting code data. One or more selected weights of the plurality of selected weights is adjusted using a test signal or the error-correcting code data during operation of the apparatus.

Optionally, the optical communications receiver 30 includes a standard free-space optical communications receiver or a standard underwater optical communications receiver.

Another embodiment of the invention is described as follows with reference by way of illustration to FIGS. 1-3.

CNN Background

A standard CNN is a standard, supervised machine learning algorithm, which can be viewed as a function composition (o) chain of L (also the number of layers) alternating linear and non-linear functions:

$$f(x) = a_L \cdot b_L \cdot a_{L-1} \cdot b_{L-1} \cdot \ldots \cdot a_1 \cdot b_1(x),$$

Where for layer j, $a_j$ is a non-linear activation function and $b_j(x) = W_j x + \beta_j$ is a linear function which applies a set of weights, $W_j$, and biases, $\beta_j$, to an input, x. For simplicity we will refer to the collection of weights, $W_j$, and biases, $\beta_j$, for all j=1, . . . , L, as the set of weights comprising the neural network.

CNNs contain several layers which are composed of convolutional filters which mimic the receptive field known to exist in mammalian eyes. In each convolutional layer, a collection of filter sets, each composed of 2-D filters equal to the number of input channels, are trained. These trained filters are convolved with the input to create a number of convolutional outputs or activations dependent on the spatial size of the filters, the stride (distance between receptive fields), and padding. The activations are processed by a standard non-linear activation function, such as a rectified linear unit ("ReLU"), which allows for additional layers to further contribute to the learning task. Optionally, a standard max-pooling (MP) operator is added before the activation function to reduce computational demands and add translational invariance. This translational invariance is useful, as it removes the need for pixel-wise alignment for the receiver side.

After a series of convolutional layers, the notion of spatial information is abandoned and all input neurons become connected to all output neurons in a series of fully-connected layers. For the purpose of this specification, the series of convolutional layers for a CNN includes at least one such convolutional layer. In practice, the number of convolutional layers in the series of convolutional layers is a function of the computational power, desired runtime of the network, and/or the desired accuracy of the neural network. Generally, additional layers increase accuracy, hardware requirements, and/or runtime. Each layer in the series of convolutional layers includes respective layer weights. How the layer weights for a given layer act on the input to that layer is defined by that layer's architecture, i.e., the receptive field of that layer. The fully-connected layers are separated by the non-linear activation function discussed above, but also contain a regularizing dropout unit to avoid overfitting. The final layer of the network represents the unique classes that are to be separated. During training, the labeled training data is passed through the network multiple times, each complete pass of the training data being known as an epoch. Once a labeled image (in reality, a series of images is processed together in a mini-batch) has been processed by the network, a standard loss function (e.g. a standard softmax-multinomial-logistic) measures the error. This error is back-propagated through the neural network 150 using the standard chain rule, and the layer weights are updated using stochastic gradient descent ("SGD")—thus minimizing the loss function. One of ordinary skill in the art will readily appreciate that other standard optimization formulas such as, mean square error, mean square logarithmic error, $L_p$ error, mean absolute error, mean absolute percent error, Kullback-Leibler Divergence, cross entropy, negative logarithmic likelihood, Poisson, cosine proximity, hinge, and squared hinge, are used in other embodiments of the invention. One of ordinary skill in the art will readily appreciate that other standard techniques for minimizing an objective function, such as Hessian-free optimization, Broyden-Fletcher-Goldfarb-Shanno algorithm ("BFGS"), and variants of SGD such as Momentum-, Nysterov-SGD, Adagrad-SGD, Adadelta-SGD, RMSprop-SGD, Adam-SGD, AMSGrad-SGD, and Nadam-SGD, are used in other embodiments of the invention. Once trained, the neural network 150 in the testing phase produces a probability for each input (i.e., each two-dimensional image produced by the imager 110 from the turbulence-distorted optical signal) as belonging to one of the unique combinatorial multiplexings comprising 170 or 180.

CNN-Based Demultiplexing—Training Phase

The training phase of the CNN-based demultiplexing method according to this embodiment of the invention allows development of a set of neural network weights which are optimized for a particular set of OAM mode numbers, $\mathcal{M}$, carried by a particular beam type. The neural network weights include the collection of layer weights, i.e., weights from layer 1, layer 2, etc. for the series of convolutional layers discussed above. The network is trained using intensity images acquired at the receiver 30. These intensity images, covering the necessary turbulence levels expected for the operation of the system and of sufficient number per unique combinatorial multiplexing to allow the network weights to converge to a non-trivial solution during training, are paired with a label indicating the modes which were active in the received beam from $\mathcal{M}$. Training of the network takes into account various levels of turbulence; however, no image preprocessing (to take care of angular misalignment) it required. If training accuracy is not sufficient for the application additional intensity images are acquired at the receiver 30.

Training the CNN according to this demultiplexing method embodiment of the instant invention involves acquiring a number of different turbulence realizations of the combinatorial combinations of the mode set for varying levels of turbulence. This collection is, for example, done in a controlled lab-based environment where turbulence is simulated by turbulence screens displayed on SLMs or in the environment where such a system will be deployed. A neural network is, for example, trained to be robust across a continuum of turbulence levels or several nets can be developed which specialize on different ranges of turbulence. If several neural networks are used in the demultiplexing method embodiment of the invention then a determination of the current turbulence level is made, for example, using a standard intermittent probe beam.

An illustrative network architecture according to an embodiment of the invention includes a standard AlexNet network and is, for example, composed of 5 convolutional layers and 3 fully-connected layers. That is, layers 1-5 are convolutional (and include max-pooling, and ReLU) and layers 6-8 are fully-connected (and include dropout and ReLU). Table 1 provides an illustrative, network topology for the AlexNet network according to an embodiment of the instant invention.

TABLE 1

Architecture for CNN-based Demultiplexing Method

| Conv1 | 96 | 11 × 11 | 4 | MP(2 × 2) + ReLU |
|---|---|---|---|---|
| Conv2 | 256 | 5 × 5 | 1 | MP(2 × 2) + ReLU |
| Conv3 | 384 | 3 × 3 | 1 | ReLU |
| Conv4 | 384 | 3 × 3 | 1 | ReLU |
| Conv5 | 256 | 3 × 3 | 1 | MP(2 × 2) + ReLU |
| FC6 | 4096 | — | — | ReLU + Dropout |
| FC7 | 4096 | — | — | ReLU + Dropout |
| FC8 | $2^M$ | — | — | — |

The AlexNet network is trained from scratch (e.g., by initializing all weights to random Gaussians) or alternatively is trained by fine-tuning from previously trained weights (e.g. standard weights from the Imagenet Classification Challenge). In the fine-tuning procedure, the previously trained weights from all but the last layer are transferred to a new network. The final layer is defined to have $2^M$ outputs, one for each unique M-bit string, initialized as Gaussian random variables. The learning rate for the final layer also contains a learning rate multiplier of 10× that of the other layers. This procedure works well because the weights learned for classification of one type images serve as a good initialization for the weights needed for the classification of another type of image. Because the lower layers learn the most general weights, the learning rate is increased for the final layer so that it can tuned to the specific task. Alternatively, the previously trained weights of other OAM-based CNNs, i.e., neural networks trained with a different mode set or different carrying beam, are used to fine-tune a new network. In Table 2, standard hyperparameters for training the network are defined.

TABLE 2

Hyperparameters for CNN Training

| Parameter | Value |
|---|---|
| Iterations | 4000 |
| Step Size | 1000 |
| Batch Size | 256 |
| Base LR | 0.001 |
| Gamma | 0.1 |
| Momentum | 0.9 |
| Weight Decay | 0.0005 |

CNN-Based Demultiplexing—Testing Phase

Once an image of the OAM encoded signal is recorded at the receiver side, it is passed through the trained network 150 and a probability is produced for each possible multiplexing (or simply which trained multiplexing class had the highest probability). By selecting the bit-string label corresponding to the highest probability one can demultiplex the received signal. The active OAM modes are the modes corresponding to the bits in the bit-string which are 'on'.

Depending on the desired bit-error-ratio forward and backward correcting error codes can be added to the system. The probabilities will also produce a measure of certainty for the received beam which could be used in error-correcting codes.

For computational reasons, it is better to take all the images received over a short time frame and pass them through the trained network together. The trained networks are deployed on standard GPUs, standard field programmable gate arrays ("FPGAs"), or standard neuromorphic chips depending on SWAP constraints for a user's application.

CNN-Based Demultiplexing System Setup

An illustrative setup of the CNN-based demultiplexing method embodiment of the invention is depicted in FIG. 1. In this setup, there are two sides: a transmit side including the optical communications transmitter 20 and a receive side including the optical communication systems receiver 30. First, laser light is collimated. Next, a standard hologram is created to represent the OAM mode-encoded signal. This hologram is displayed on the mode multiplexer 50, e.g., the SLM, and after the plane wave interferes with the hologram the beam propagates in free space until it is recorded by the imager 110, e.g., a camera.

On the transmit side, given a desired signal to transmit and an appropriately sized set of OAM modes $\mathcal{M}$, a hologram is displayed on a SLM which transforms a plane wave produced by a laser 40 into a specific OAM carrying beam (e.g., Bessel-Gauss) with the corresponding set of active OAM modes from $\mathcal{M}$. The active modes are selected such that their bit-string will match that of the desired signal to be transmitted. The output of this mode multiplexer 50 is pin-holed to preserve only the 1st diffractive order and then allowed to propagate in free space. The CNN-based demultiplexing method embodiment of the instant invention is agnostic as to the method by which the OAM-encoded beam is created. For example, in alternative embodiments of the invention, the OAM-encoded beam is generated using standard q-plates, standard spiral phase plates, and/or standard cylindrical lenses.

On the receiver side, the OAM-encoded beam is directed onto a standard focal plane array of an imaging system 110. After the image is recovered from the OAM-encoded beam, the data is transferred to the demultiplexer 160, which can process the multiplexed image through the trained CNN.

The output of the neural network 150 is a vector of probabilities with a 1:1 mapping to the set of possible bit-strings. Selecting the most likely bit-string label produces the desired demultiplexing.

Alternative components of the above-described CNN-based demultiplexing method embodiments of the invention include the following.

An embodiment of the invention is agnostic as to the carrying beam. Any set of unique patterns is usable. Those created by OAM, as discussed by way of example above, are just a subset of patterned or structured light. Accordingly, alternative OAM carrying beams include any standard beam formed by standard solutions to the Helmholtz equation in any coordinate system. A non-exhaustive list of other possible OAM carrying beams include: standard Bessel beams, standard Bessel-Gauss beams, standard Laguerre-CGauss beams, standard Hermite-Gauss beams, Ince-Gauss beams, and standard Mathieu-Gauss beams.

The signal encoding strategy presented above in the description of an embodiment of the invention included an OAM mode representing each bit in a bit string by multiplexing them together. However, one of ordinary skill in the art will readily appreciate that a CNN-based demultiplexing method according to other embodiments of the invention do not require the modes be multiplexed. For example, in an alternative embodiment of the invention, a unique mode is assigned to each distinct signal needing to be transmitted. As another example, each actor wanting to communicate across a common communication link according to another embodiment of the invention, is assigned one or more unique OAM modes.

The type of neural network presented above in the description of an embodiment of the invention included a CNN. However, one of ordinary skill in the art will readily appreciate that any neural network which can handle 2-dimensional (i.e., image) data are used in other embodiments of the invention. For example, another embodiment of the invention includes a recurrent neural network ("RNN").

The network structure presented above in the description of an embodiment of the invention is but one of many possible architectural constructions. Based on the FSO problem under consideration, the network structure is optimized, for example, by changing the number of the layers, the types of layers, the number of neurons in a layer, the pre-processing of the data, the type of activation function, the type of pooling operator, and/or the kernel sizes and types.

In terms of the neural network output, the neural network in an alternative embodiment of the invention, instead of having a single terminal node representing each unique multiplexing. includes a terminal node representing each unique dictionary atom. Such an alternative embodiment allows for a larger dictionary, as it removes the exponential growth of terminal nodes. Training this neural network design involves giving each unique combinatorial multiplexing several labels—one corresponding to each active mode. Once trained, this neural network in its testing phase learns a threshold on the network output probabilities to declare whether each mode was present or not in the signal. The activations from such a trained network, at a specific layer or several layers, are used as input to another standard machine-learning classifier, such as a standard unsupervised clustering algorithm (e.g. hierarchal, centroid, and/or distributional) or a standard supervised learning model, such as a standard Support Vector Machine ("SVM").

An embodiment of the invention is compatible with OAM multiplexing combined with other standard multiplexing techniques. For example, an embodiment of the invention includes a wavelength and OAM multiplexed signal; in such an embodiment of the invention, either a series of wavelength filters is deployed in front of the imager or a compact multispectral camera is used. Once the wavelengths are demultiplexed, the CNN-based solution, for example, as presented above, is applied.

An embodiment of the invention comprises computer program instructions, which computer program instructions embody the steps, functions, filters, and/or subsystems described herein relative to the various demultiplexing method embodiments of the invention described above. However, it should be apparent that there could be many different ways of implementing the invention in computer programming, and the invention should not be construed as limited to any one set of computer program instructions. Further, a skilled programmer would be able to write such a computer program to implement an exemplary embodiment based on the appended diagrams and associated description in the application text. Therefore, disclosure of a particular set of program code instructions is not considered necessary for an adequate understanding of how to make and use the invention. The inventive functionality of the claimed computer program will be explained in more detail in the following description read in conjunction with the program flow in the embodiments of the invention described above.

One of ordinary skill in the art will recognize that the methods, systems, and control laws discussed above may be implemented in software as software modules or instructions, in hardware (e.g., a standard application-specific integrated circuit ("ASIC")), or in a combination of software and hardware. The methods, systems, and control laws described herein may be implemented on many different types of processing devices by program code comprising program instructions that are executable by one or more processors. The software program instructions may include source code, object code, machine code, or any other stored data that is operable to cause a processing system to perform methods described herein.

The methods, systems, and control laws may be provided on many different types of standard computer-readable media including standard computer storage mechanisms (e.g., CD-ROM, diskette, RAM, flash memory, computer's hard drive, etc.) that contain instructions for use in execution by a standard processor to perform the methods' operations and implement the systems described herein.

The computer components, software modules, functions and/or data structures described herein may be connected directly or indirectly to each other in order to allow the flow of data needed for their operations. It is also noted that software instructions or a module can be implemented for example as a subroutine unit or code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

Systems and methods disclosed herein may use data signals conveyed using networks (e.g., local area network, wide area network, internet, etc.), fiber optic medium, carrier waves, wireless networks, etc. for communication with one or more data-processing devices. The data signals can carry any or all of the data disclosed herein that is provided to or from a device.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. An apparatus comprising:
    an optical communications receiver receiving a turbulence-distorted, optical signal comprising a plurality of fundamental modes encoded via a combinatorial multiplexings dictionary, the received optical signal comprising a plurality of two-dimensional images, each two-dimensional image of the plurality of two-dimensional images respectively representing received fundamental modes of the plurality of fundamental modes,
    said receiver comprising a neural network trained to assign to each two-dimensional image of the plurality of two-dimensional images at least one respective active fundamental mode of the plurality of fundamental modes and a corresponding accuracy probability based on the dictionary.

2. The apparatus according to claim 1, further comprising:
    an optical communications transmitter transmitting an original, optical signal to said optical communications receiver, the optical signal being converted by an environment into the turbulence-distorted, optical signal.

3. The apparatus according to claim 2, wherein said receiver comprises a demultiplexer, said demultiplexer comprising said neural network,
    wherein said optical communications transmitter comprises a laser, a mode multiplexer communicating with said laser, and a processor communicating with said mode multiplexer to generate the original, optical signal.

4. The apparatus according to claim 3, wherein said mode multiplexer comprises at least one of a spatial and temporal phase modulator and a spatial and temporal amplitude modulator,
    wherein said spatial and temporal phase modulator comprises one of a spatial light modulator, a diffractive waveplate, and a phase plate
    wherein said spatial and temporal amplitude modulator comprises one of a spatial light modulator and a coded mask.

5. The apparatus according to claim 2, wherein said optical communications transmitter comprises one of a free-space optical communications transmitter and an underwater optical communications transmitter.

6. The apparatus according to claim 1, wherein said optical communications receiver comprises an imager communicating with said demultiplexer.

7. The apparatus according to claim 1, wherein said neural network comprises at least one of a Recurrent Neural Network, a Convolutional Neural Network, a Feed Forward Neural Network, a Long Term Short Term Memory Neural Network, a Residual Neural Network, a Multilayer Perceptron, a Hopfield Neural Network, a Stacked Autoencoder, and a Deep Belief Network.

8. The apparatus according to claim 1, wherein said neural network comprises a plurality of weights,
    the apparatus further comprising:
    a training set of turbulence-distorted, multiplexed fundamental modes, said plurality of weights being trained on said training set.

9. The apparatus according to claim 1, wherein said optical communications receiver comprises one of a free-space optical communications receiver and an underwater optical communications receiver.

10. A method comprising:
    selecting a plurality of fundamental modes, the selected plurality of fundamental modes comprising a number of the plurality of fundamental modes and a type of the plurality of fundamental modes;
    generating a first training set of turbulence-distorted fundamental modes based on the selected plurality of fundamental modes;
    training a neural network using the first training set;
    providing an optical communications receiver comprising the trained neural network.

11. The method according to claim 10, wherein the optical communications receiver comprises the trained neural network,
    the method further comprising:
    receiving at the optical communications receiver a turbulence-distorted, optical signal encoded using a combinatorial multiplexings dictionary, the received optical signal comprising a plurality of two-dimensional images representing the plurality of fundamental modes; and
    assigning to the each two-dimensional image of the plurality of two-dimensional images at least one respective active fundamental mode of the plurality of fundamental modes and a corresponding accuracy probability based on the dictionary using a neural network.

12. The method according to claim 11, wherein the neural network comprises a demultiplexer, the demultiplexer comprising the trained neural network,
    wherein the plurality of two-dimensional images represents multiplexed fundamental modes of the plurality of fundamental modes.

13. The method according to claim 12, wherein said multiplexed fundamental modes of the plurality of fundamental modes comprise at least one of wavelength-multiplexed fundamental modes of the plurality of fundamental modes and spatial multiplexed fundamental modes of the plurality of fundamental modes.

14. The method according claim 12, wherein the optical communications receiver comprises an imager communicating with the demultiplexer,
    wherein said receiving at the optical communications receiver a turbulence-distorted, optical signal comprises:
    receiving the turbulence-distorted, optical signal using the imager,
    generating the plurality of two-dimensional images using the imager; and transmitting the each two-dimensional image of the plurality of two-dimensional images from the imager to the demultiplexer.

15. The method according to claim 11, wherein the dictionary comprises a plurality of the combinatorial multiplexings of the selected plurality of fundamental modes,
   wherein the first training set of turbulence-distorted, fundamental modes comprises a plurality of turbulence-distorted realizations for each combinatorial multiplexings of the plurality of combinatorial multiplexings;
   wherein the method further comprises:
   generating the combinatorial multiplexings dictionary based on the plurality of combinatorial multiplexings of the selected plurality of fundamental modes.

16. The method according to claim 11, wherein said assigning to the each two-dimensional image of the plurality of two-dimensional images at least one respective active fundamental mode of the plurality of fundamental modes and a corresponding accuracy probability comprises one of:
   outputting, using the neural network, a single label corresponding to the plurality of combinatorial multiplexings and a probability distribution over the plurality of combinatorial multiplexings; and
   outputting, using the neural network, a plurality of labels respectively corresponding to the fundamental modes, and a plurality of probability distributions of the selected plurality of fundamental modes.

17. The method according to claim 11, wherein the neural network comprises a plurality of weights, the plurality of weights being set by the neural network trained on the first training set,
   the method further comprising:
   generating a second training set of turbulence-distorted fundamental modes based on the selected plurality of fundamental modes, the second training set being at least partly different from the first training set; and
   training the neural network using the second training set, thereby fine-tuning the plurality of weights.

18. The method according to claim 17, wherein the original, optical signal comprises error-correcting code data,
   the method further comprising:
   adjusting at least one selected weight of the plurality of selected weights, using one of a test signal and the error-correcting code data.

19. The apparatus according to claim 10, wherein said optical communications receiver comprises one of a free-space optical communications receiver and an underwater optical communications receiver.

* * * * *